United States Patent
Morrish (10) Patent No.: US 7,102,613 B1
(45) Date of Patent: *Sep. 5, 2006

(54) LOW COST VERTICAL VISUAL INDICATOR SYSTEM FOR ON SCREEN DISPLAYS

(75) Inventor: Andy Morrish, Saratoga, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 688 days.

This patent is subject to a terminal disclaimer.

(21) Appl. No.: 09/907,720

(22) Filed: Jul. 17, 2001

(51) Int. Cl.
*G09G 5/00* (2006.01)

(52) U.S. Cl. .................... 345/156; 715/722; 348/569

(58) Field of Classification Search ........ 345/156–173, 345/716, 722, 772, 786, 785; 715/716, 722, 715/772, 786, 784–787, 830, 833, 858, 718; 348/511, 569, 563
See application file for complete search history.

(56) References Cited

U.S. PATENT DOCUMENTS

| | | | | |
|---|---|---|---|---|
| 5,764,179 A | * | 6/1998 | Tsurumoto | 341/176 |
| 5,781,247 A | * | 7/1998 | Wehmeyer et al. | 348/569 |
| 5,963,266 A | * | 10/1999 | Fujimori | 348/511 |
| 6,016,144 A | * | 1/2000 | Blonstein et al. | 345/791 |
| 6,256,027 B1 | * | 7/2001 | Jeong et al. | 345/788 |
| 6,433,796 B1 | * | 8/2002 | Taguchi | 715/753 |
| 6,590,595 B1 | * | 7/2003 | Wagner et al. | 345/784 |
| 6,628,324 B1 | * | 9/2003 | Onishi et al. | 348/177 |
| 6,911,959 B1 | * | 6/2005 | Morrish | 345/35 |

* cited by examiner

*Primary Examiner*—Xiao Wu
(74) *Attorney, Agent, or Firm*—Merchant & Gould P.C.; Timothy P. Sullivan (57) ABSTRACT

A circuit has been shown to illustrate how a vertical indicator can be generated in logic for a simplified OSD generator. The vertical visual indicator generated uses little microcontroller firmware overhead allowing a less powerful microcontroller to be used in the specific application, thus lowering system cost. A single byte is written to a counter to indicate the position of the vertical indicator. The OSD video coming from the OSD logic is overridden with a pixel overwrite signal when the location of the vertical indicator is located. The pixels overwrite whatever is located below the position of the vertical indicator. The pixel overwrite occurs for a predetermined time to fill a predetermined number of pixels. For example, if the vertical indicator is three pixels wide then the pixel overwrite signal occurs until three pixels have been overwritten.

20 Claims, 12 Drawing Sheets

LOW COST VERTICAL VISUAL INDICATOR SYSTEM FOR ON SCREEN DISPLAYS

FIELD OF THE INVENTION

The present invention is related to electronics, and more specifically to an electronic circuit for displaying a vertical indicator on an on screen display.

BACKGROUND OF THE INVENTION

Many computers, televisions, and other equipment use on screen displays (OSDs) to display and adjust parameters related to the equipment. For example, OSDs may visually represent the level of volume, contrast, brightness, vertical position, horizontal position, and the like. While the user is adjusting the parameter, the OSD provides visual feedback to the user relating to the adjustment they are performing.

One common method of visual feedback employed in OSDs is to generate an indicator to show a parameter's level. An indicator typically shows the range of adjustment the parameter may be adjusted within as well as the current value of the parameter. For example, an indicator may be used to display a vertical position parameter for a screen.

A common technique for displaying a bar indicator within an OSD is to display characters on a display of the equipment. Such an OSD system is referred to as a character based system. In such an OSD system, several characters are typically used to represent portions of the OSD. For example, some characters are used to represent a background for the OSD and several other characters are used to represent the indicator. One such prior art system is illustrated in FIG. 1.

Figure 1:
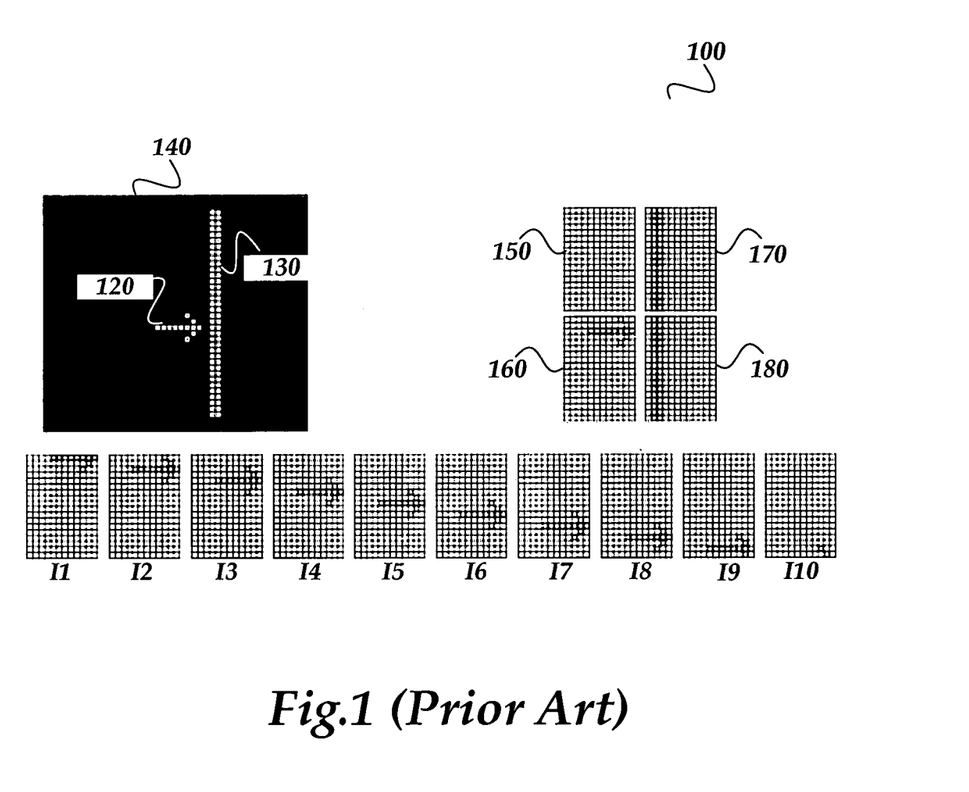
FIG. 1 illustrates schematic diagrams of a prior art OSD vertical indicator system.

FIG. 1 shows a prior art vertical indicator system. As shown in the figure, vertical indicator system 100 includes indicator arrow 120, vertical bar 130, and background 140. Icons I1–I10 illustrate different positions of indicator arrow 120 within a character. Characters 150–180 show vertical arrow system 100 divided into four different characters.

Character 150 shows a blank background character. Character 160 shows indicator arrow at a top position of the character. Characters 170 and 180 show characters representing vertical bar 130.

According to vertical arrow system 100, each character (I1–I10) represents a different location for the indicator arrow within a character. When the user steps through a sequence adjusting a parameter, indicator arrow 120 appears to move up or down in response to the change in sequence number. Character I1 shows indicator arrow 120 at the top of a character, while character I10 shows indicator arrow 120 at the bottom of a character.

Typically, the parameter value for the indicator arrow ranges between a minimum value and a maximum value. For example, the range may be between zero (0) and ten (10). As the user adjusts the parameter, the icon arrow appears to increment up or down from 1 to 10 providing feedback to the user. In order to achieve this effect, the microcontroller determines where the indicator arrow should be placed and selects the appropriate character. For example, the microcontroller selects from icons I1–I10 to achieve this effect. In practice, to facilitate this, the microcontroller runs a firmware routine that takes the sequence value, and maps the value to a particular icon character using a lookup table. This character is then written to the OSD page RAM.

This manipulation requires significant computation on the part of the low power microcontroller. Consequently, the firmware to provide this feature is quite large, takes up significant ROM space, and uses significant computation power.

SUMMARY OF THE INVENTION

The present invention is directed at providing a vertical indicator system that minimizes the burden placed on the microcontroller. A vertical indicator can be generated that requires very little microcontroller firmware overhead, allowing a less powerful microcontroller to be used in the application. The reduced firmware requirement translates into smaller microcontroller firmware ROM requirements, thus enabling a lower cost system to be realized.

According to another aspect of the invention, the position of the vertical indicator is determined from a byte written to a counter. The vertical indicator value is readily available without significant calculation. For example, if a four-bit value is sent that represents the position of the vertical indicator then that value may be used directly. Alternatively, the eight-bit value may be converted to a four-bit value, or some other value based on the value used by the system.

According to yet another aspect of the invention, the OSD video coming from the OSD logic is overridden with a pixel overwrite when the location of the vertical indicator is located. The pixels overwrite whatever is located below the position of the vertical indicator.

According to another aspect of the invention, the pixel overwrite occurs for a predetermined time to fill a predetermined number of pixels. For example, if the vertical indicator is three pixels wide then the pixel overwrite occurs until three pixels have been overwritten.

According to still yet another aspect of the invention, the OSD circuit requires less firmware than a character-based system. The location to draw the vertical indicator is located and a timer is used to time the duration of the pixel overwrite. The green, blue, and red video is not selected from the OSD logic while the timer is active.

DETAILED DESCRIPTION OF THE PREFERRED EMBODIMENT

In the following detailed description of exemplary embodiments of the invention, reference is made to the accompanied drawings, which form a part hereof, and which is shown by way of illustration, specific exemplary embodiments of which the invention may be practiced. These embodiments are described in sufficient detail to enable those skilled in the art to practice the invention, and it is to be understood that other embodiments may be utilized, and other changes may be made, without departing from the spirit or scope of the present invention. The following detailed description is, therefore, not to be taken in a limiting sense, and the scope of the present invention is defined only by the appended claims.

Throughout the specification and claims, the following terms take the meanings explicitly associated herein, unless the context clearly dictates otherwise. The term "connected" means a direct electrical connection between the items connected, without any intermediate devices. The term "coupled" means either, a direct electrical connection between the items connected, or an indirect connection through one or more passive or active intermediary devices. The term "circuit" means either a single component or a multiplicity of components, either active and/or passive, that are coupled to provide a desired function. The term "signal" means at least one current, voltage, or data signal. Referring to the drawings, like numbers indicate like parts throughout the views.

A specific implementation is described for exemplary purposes, but the concepts described herein may be applied to similar devices with perhaps different outward appearances.

Briefly described, the present invention is directed at providing a vertical indicator that does not place a burden on the microcontroller. In the OSD vertical indicator system a frame is drawn on which a vertical indicator can be implemented. To generate the vertical indicator, an area of the OSD frame is defined as the vertical index indicator area. According to one embodiment, a portion of the vertical indicator area is filled with a predetermined number of pixels.

Figure 2:
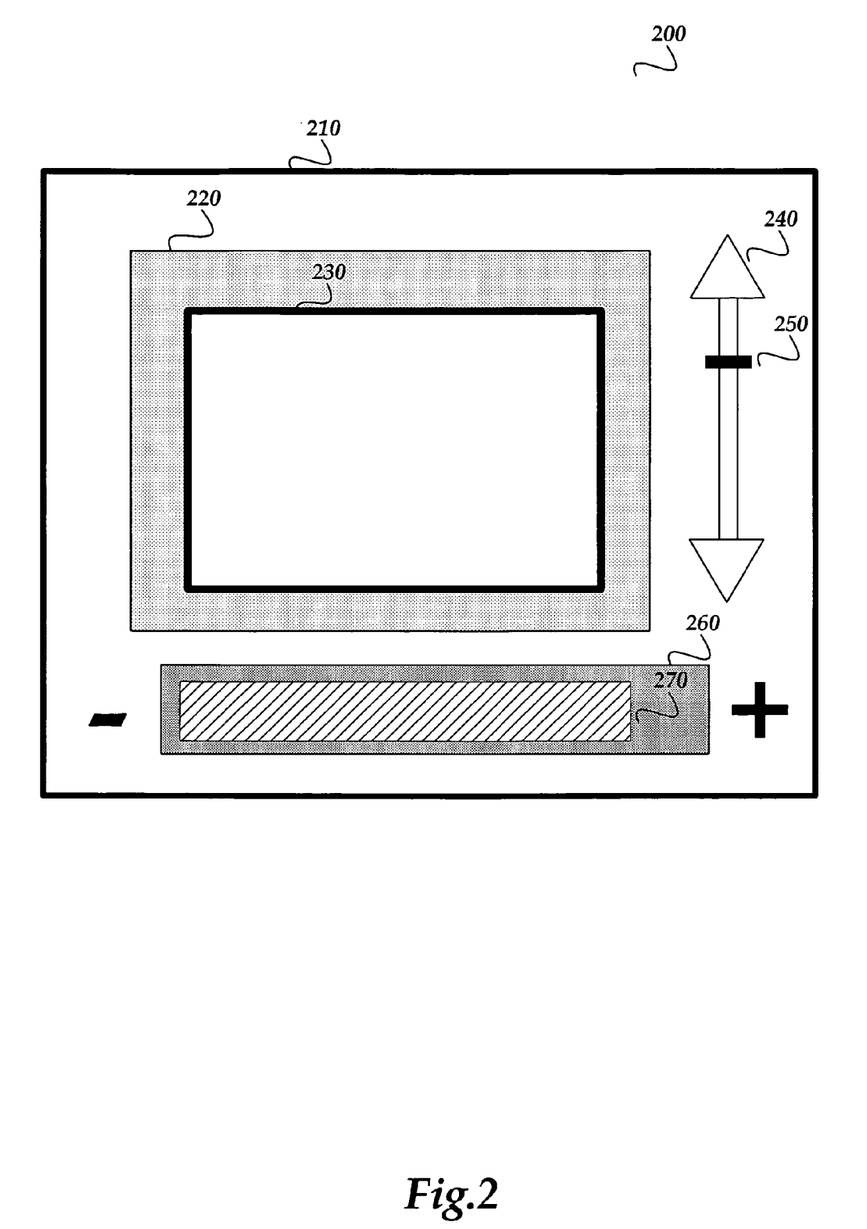
FIG. 2 shows an exemplary diagram of an OSD frame.

FIG. 2 shows an exemplary diagram of an OSD frame, according to one embodiment of the invention. As shown in the figure, OSD frame 200 includes frame 210, screen frame 220, programmable area 230, vertical bar 240, vertical indicator 250, horizontal bar frame 260, and horizontal bar indicator 270.

Frame 210 encloses screen frame 220, programmable screen 230, vertical bar 240, vertical indicator 250, horizontal bar frame 260, and horizontal bar indicator 270. Screen frame 220 encloses programmable area 230. Vertical indicator 250 is positioned along vertical bar 240, and horizontal bar indicator 270 is located and sized to be within horizontal bar frame 260.

According to one embodiment of the invention, OSD frame 200 is a 6×5 character matrix, is preprogrammed within the device, and is static. The OSD frame may be turned on or off by an external command from the microcontroller. Each of the characters within the OSD is an 8×8 pixel cell and may use up to four colors. For example, according to one embodiment, within a simple OSD device, OSD frame 200 appears as shown in the figure. As OSD frame 200 is preprogrammed, the microcontroller stores and sends only minimal information at power up regarding the size and position of simple OSD frame 200 on the displayed screen, and is thereafter simply turned on or off by writing to one register. According to another embodiment, the OSD frame may be dynamic and changed based on the parameter being adjusted.

The simple OSD frame shows the user basic views of the functions that are the subject of the interface. According to the present example, which is designed for computer display applications, OSD frame 200 gives the user the appearance of a computer screen. As will be appreciated, many other OSD frames may be designed. For example, the OSD frame may give the appearance of a phone, a television, or any other device consistent with the application. Within screen frame 220 is programmable area 230. Programmable area 230 allows substitution of up to six different characters. Other sizes may be chosen for programmable area 230. According to one embodiment, up to sixteen different adjustment icons (See FIGS. 11 and 12 for representative icons) may be displayed within the programmable area to provide the user with information about the selected function. In this way, the same basic information that may be presented through a conventional non-OSD approach, where the same basic icons may have either been printed or embossed on the bezel of the device, may be shown in the OSD. The icons may be chosen in many different ways. For example, a bit code may be sent to the OSD that maps the appropriate icons into programmable area 230 without external intervention by the microcontroller.

As will be appreciated in view of the present disclosure, the size, shape, and color of the frame and the icon space may be different between applications, but the same general concept may be applied as in the present example, which is described herein only as an illustration of the invention.

Figure 3:
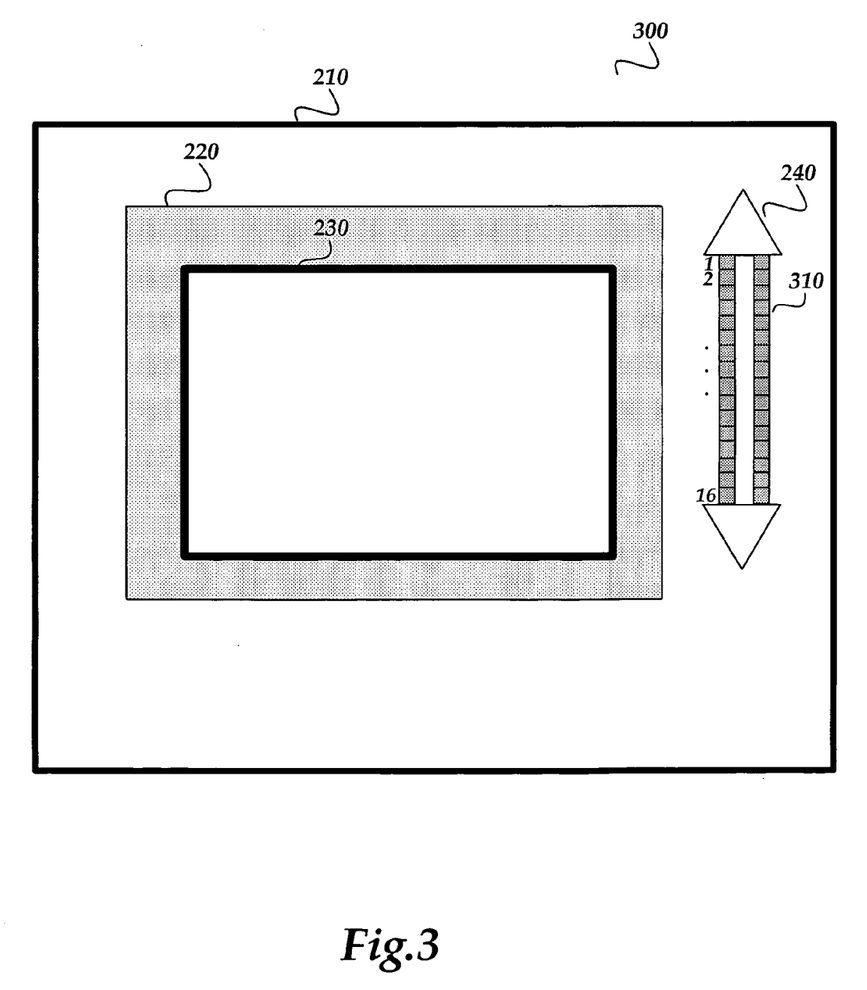
FIG. 3 illustrates a schematic diagram of an OSD frame including a pixel overwrite area for the vertical indicator.

FIG. 3 illustrates an exemplary OSD frame for displaying a vertical indicator, according to one embodiment of the invention. FIG. 3 is substantially similar to FIG. 2. However, FIG. 3 includes pixel overwrite area 310 and does not include vertical indicator 250, horizontal bar 260, or horizontal bar indicator 270.

Pixel overwrite area 310 is the area that is overwritten by a predetermined color to display vertical indicator 250 (FIG. 2). Pixel overwrite area 310 is located along vertical bar 240 and is a predetermined size. Pixel overwrite area is shown for illustrative purposes only and is not displayed to the user. According to one embodiment, pixel overwrite area 310 is sized such that a vertical indicator may be located within sixteen (16) different positions. As such, pixel overwrite area 310 is three pixels wide by sixteen (16) pixels high. The pixel overwrite area may be sized as appropriate depending on the application. For example, more or less positions to place the vertical indicator may be provided. Additionally, the width and/or height of the vertical indicator may be changed. According to another embodiment, a background frame (not shown) may be used to enclose the vertical indicator to provide an additional visual effect. For example, an enclosing frame may be longer, wider, or be a different color than the vertical indicator. According to one embodiment, pixel overwrite area 310 starts at line 0 or row 1, column 5 of the OSD frame. Vertical indicator 250 is displayed and is described in conjunction with the figures below.

Figure 4:
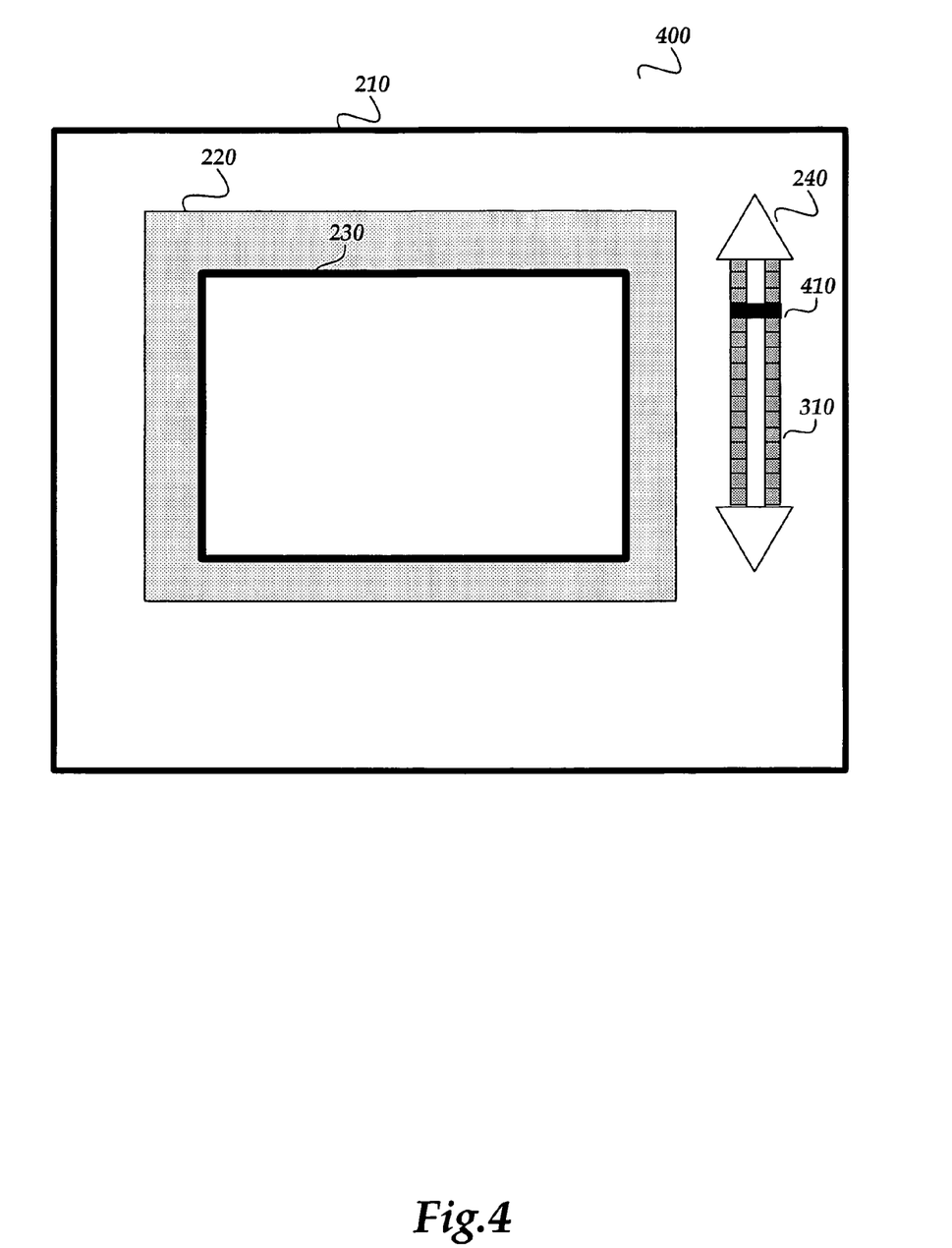
FIG. 4 illustrates a schematic diagram of an OSD with the vertical indicator at one value within the range of values.

FIG. 4 illustrates a schematic diagram of an OSD with the vertical indicator at one parameter value within the pixel overwrite area, according to one embodiment of the invention. FIG. 4 is substantially similar to FIG. 3. However, OSD system 400 includes vertical indicator 410. As shown in the figure, vertical indicator OSD system 400 includes vertical indicator 410 at location four out of sixteen, or at about 25% of its total range.

When the user adjusts a given parameter associated with the vertical indicator, the vertical indicator appears to move in response to the change in value. For example, the vertical indicator appears to move up or down in response to the adjustment the user is making. When the user adjusts the parameter to a larger value, the vertical indicator typically moves upward, and when the parameter value is decreased, the vertical indicator moves downward.

Figure 5:
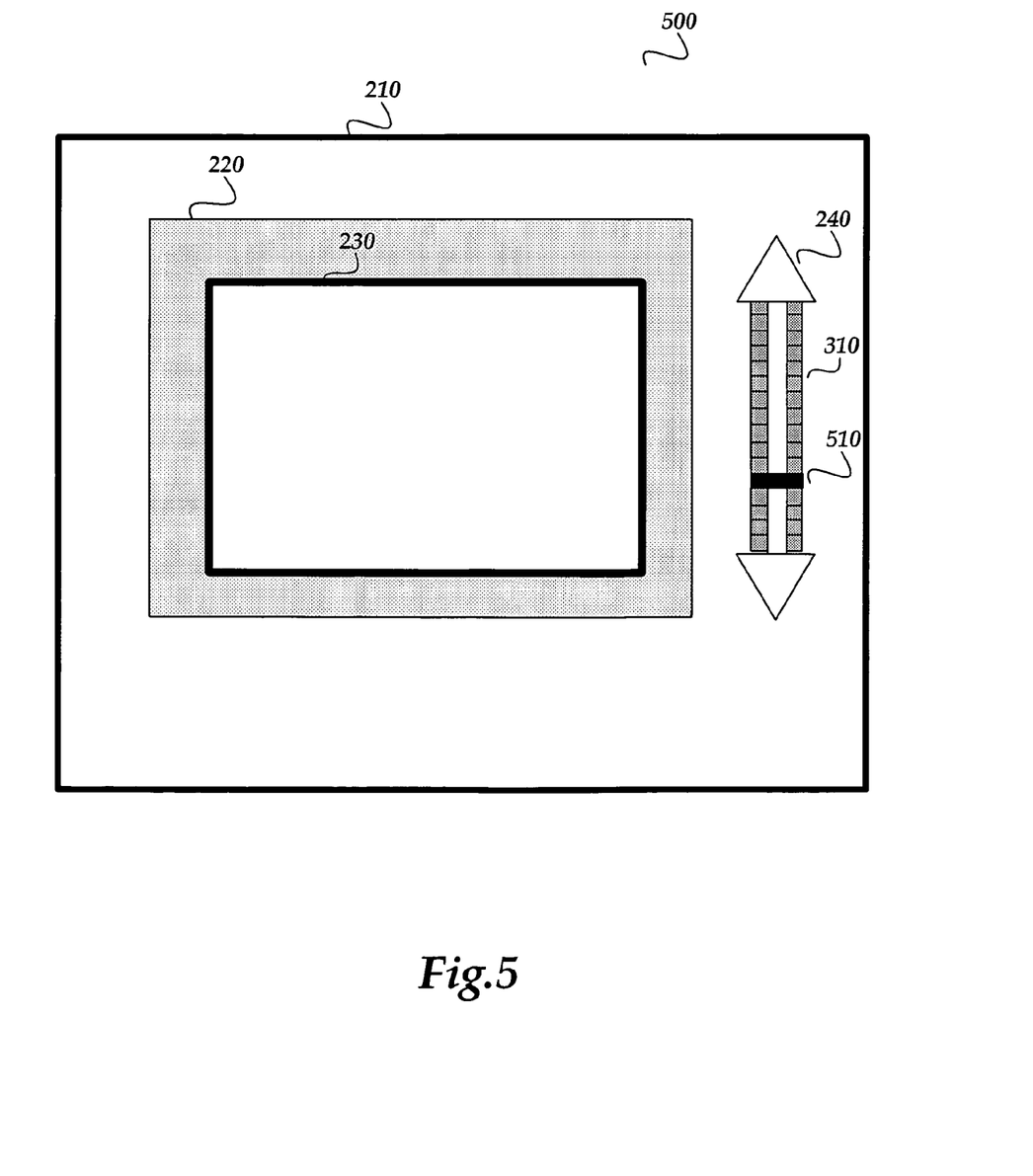
FIG. 5 illustrates a schematic diagram of an OSD with the vertical indicator at another value within the range of values.

FIG. 5 illustrates a schematic diagram of an OSD with the vertical indicator at another parameter value within the pixel overwrite area, according to one embodiment of the invention. FIG. 5 is substantially similar to FIG. 4. However, OSD vertical indicator system 500 includes vertical indicator 510. As shown in the figure, the diagram includes vertical indicator 510 at location twelve out of sixteen, or at about 75% of its total range.

Figure 6:
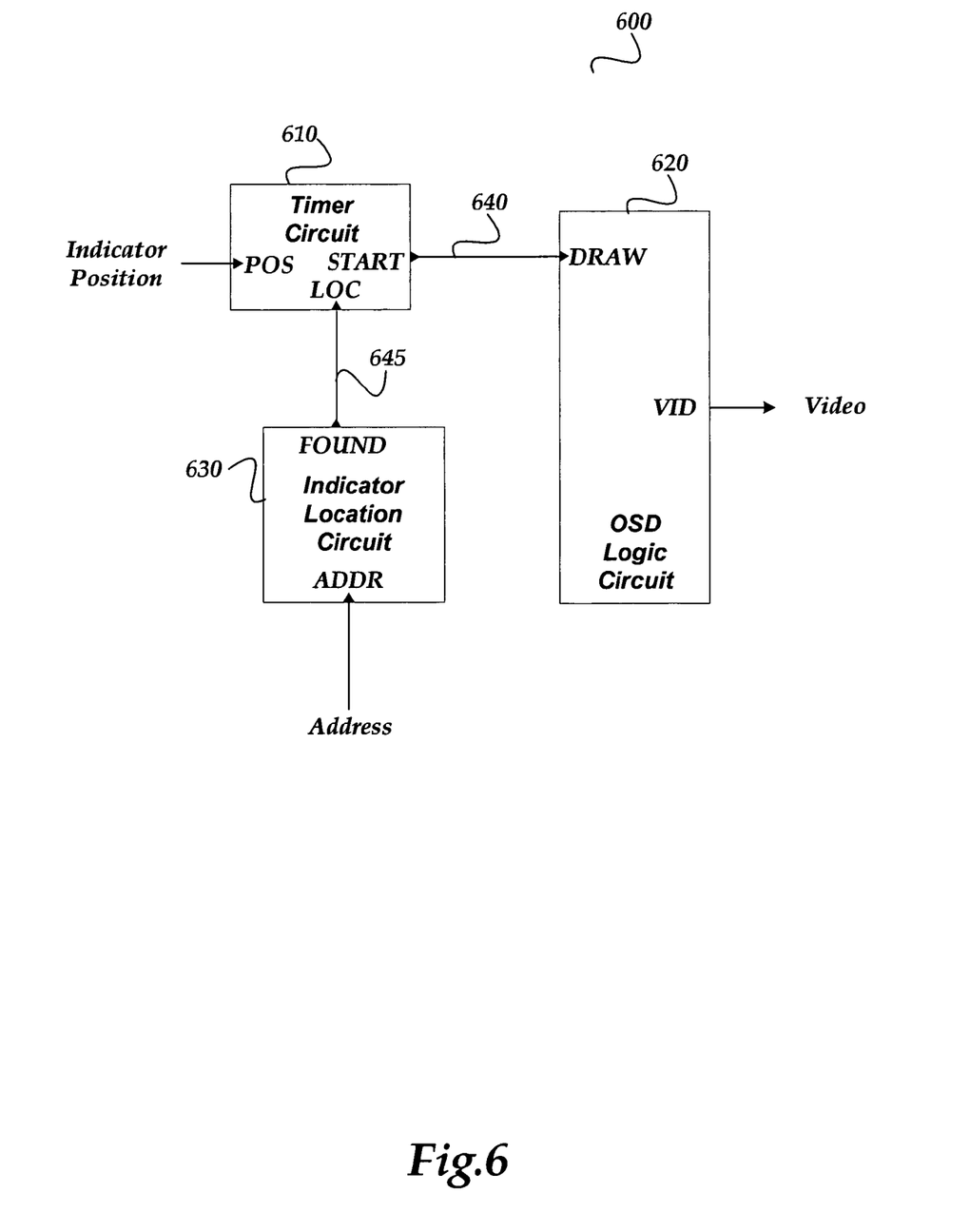
FIG. 6 shows an overview schematic diagram of an OSD vertical indicator system.

FIG. 6 shows an overview schematic diagram of an OSD vertical indicator system, according to one embodiment of the invention. As shown in the figure, OSD vertical indicator system 600 includes timer circuit 610, OSD logic circuit 620, and indicator location circuit 630.

Timer circuit 610 includes a POS input coupled to an indicator position signal, a LOC input coupled to node 645, and a START output coupled to node 640. Indicator location circuit 630 includes an ADDR input coupled to an address signal and a FOUND output coupled to node 645. OSD logic circuit 620 includes a DRAW input coupled to node 640 and a video output (VID).

Indicator location circuit 630 is arranged to receive the address signal and determine the location, or address, of the current OSD drawing position. When the address of the location where the vertical indicator is to be drawn is reached, indicator location circuit 630 is arranged to provide a found signal at node 645. The location of the indicator may change based on the specific application. Additionally, more than one indicator may be displayed within the OSD.

Timer circuit 610 sets a counter in response to the desired size for the vertical indicator. According to one embodiment, the vertical indicator is three pixels wide and has a pixel height of one pixel. The counter is set such that the desired number of pixels is drawn on the OSD before the counter expires. As will be appreciated, the counter may be set to count more or less time in order to display more or less pixels.

When timer circuit 610 receives the found signal, timer circuit 610 produces a start signal at node 640, and begins counting to the predetermined time. Timer circuit 610 produces a start signal at node 640 as long as the timer is running.

OSD logic circuit 620 is arranged to receive the start signal. During the time OSD logic circuit 620 receives the start signal, the OSD logic is overridden and the vertical indicator is drawn. More specifically, when receiving the start signal, OSD logic circuit 620 sets a pixel overwrite output forcing the video output (VID) to a specific color. According to one embodiment, the pixel overwrite color used for the vertical indicator is bright green. When OSD logic circuit 620 does not receive the start signal, the OSD logic is not overridden and the OSD video is output.

Figure 7:
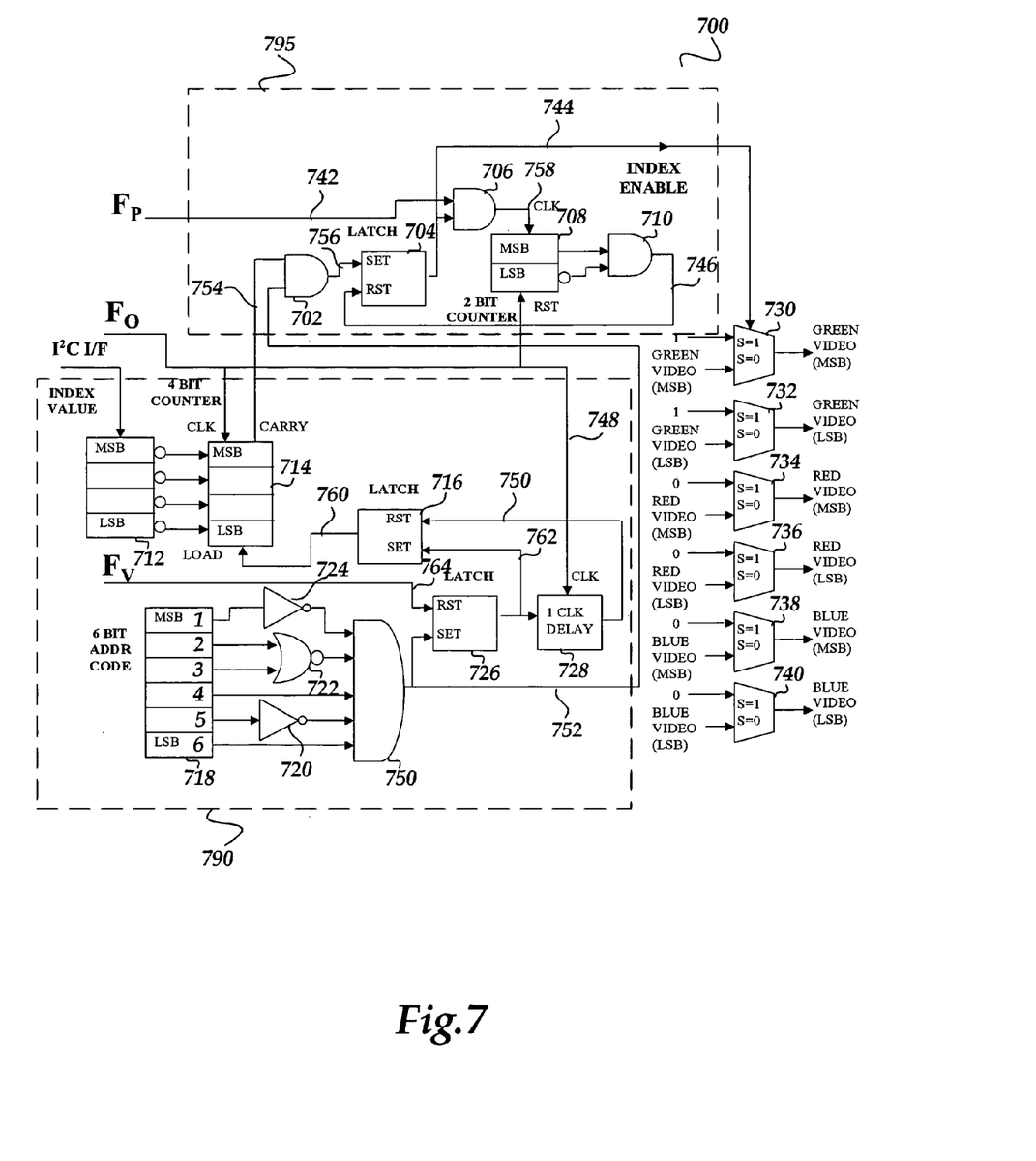
FIG. 7 shows a schematic diagram of an OSD vertical indicator system.

FIG. 7 shows a schematic diagram of an OSD vertical indicator system, according to one embodiment of the invention. As shown in the figure, OSD vertical indicator system 700 includes timer circuit 795, address circuit 790 and selectors 730, 732, 734, 736, 738, and 740. Timer circuit 795 includes AND gates 702, 706, and 710, latch 704, and 2 bit counter 708. Address circuit 790 includes 4 bit counter 714, index value storage 712, latches 716 and 726, delay circuit 728, AND gate 750, NOT gates 724 and 720, NOR gate 722, and 6 bit address code 718. FIG. 7 is shown for exemplary purposes only and is not intended to be limiting. As will be appreciated in view of the present disclosure, many other OSD vertical indicator systems may be implemented depending on the position to draw the vertical indicator system as well as the size of the vertical indicator.

AND gate 702 has an input coupled to node 754, an input coupled to node 752, and an output coupled to node 756. Latch 704 has a SET input coupled to node 756, a RST input coupled to node 746 and an output coupled to node 744. AND gate 706 has an input coupled to node 744, an input coupled to node 742 and an output coupled to node 758. 2 bit counter 708 has a RST input coupled to node 748, a CLK input coupled to node 758, a MSB output coupled to an input of AND gate 710, and a LSB output coupled to an input of AND gate 710. AND gate 710 has an output coupled to node 746.

Index value bit storage 712 has an input for receiving an index value and outputs for each of the four bits representing the index value. 4 bit counter 714 has a clock input coupled to node 748, a load input coupled to node 760, index value inputs coupled to each bit representing the index value, and an output coupled to node 754. Latch 716 has a RST input coupled to node 750, a set input coupled to node 762, and an output coupled to node 760. Delay circuit 728 has a clock input coupled to node 748, an input coupled to node 762 and an output coupled to node 750. Latch 726 has a RST input coupled to node 764, a set input coupled to node 752, and an output coupled to node 762.

NOT gate 724 has an input coupled to the MSB bit of 6 bit address code 718 and an output coupled to an input of AND gate 750. NOT gate 720 has an input coupled to the bit 5 of 6 bit address code 718 and an output coupled to an input of AND gate 750. NOR gate 722 has an input coupled to bit 2 of 6 bit address code 718, an input coupled to bit 3 of 6 bit address code 718, and an output coupled to an input of AND gate 750. AND gate 750 also has an input coupled to bit 4 of 6 bit address code 718 and an input coupled to bit 6 of 6 bit address code 718. The output of AND gate 750 is coupled to node 752.

Selectors 730–740 each have an input coupled to node 744, respectively, and two inputs that each receives a video signal. Selector 730 has an input for receiving a MSB green video signal, an input for receiving an override video signal, a select input coupled to node 744, and a green video signal (MSB) output. Selector 732 has an input for receiving a LSB green video signal, an input for receiving an override video signal, a select input coupled to node 744, and a green video signal (LSB) output. Selector 734 has an input for receiving a MSB red video signal, an input for receiving an override video signal, a select input coupled to node 744, and a red video signal (MSB) output. Selector 736 has an input for receiving a LSB red video signal, an input for receiving an override video signal, a select input coupled to node 744, and a red video signal (LSB) output. Selector 738 has an input for receiving a MSB blue video signal, an input for receiving an override video signal, a select input coupled to node 744, and a blue video signal (MSB) output. Selector 740 has an input for receiving a LSB blue video signal, an input for receiving an override video signal, a select input coupled to node 744, and a blue video signal (LSB) output.

The operation of OSD vertical indicator system 700 will now be described. Address circuit 790 determines when the start position to draw the vertical indicator has been reached by the OSD logic. 6 bit address code 718 looks for a particular frame address location. According to one embodiment, the vertical indicator may appear in character Row 1, Column 5 (6 bit address 001 101) and character Row 2, Column 5 (6 bit address 010 101). When either of these locations are addressed, the output of AND gate 750 is arranged to produce a logical high ("1") at node 752. As will be appreciated many other locations within the OSD frame may serve as a location for the vertical indicator and the logic is updated appropriately. Additionally, other addressing systems may be used to determine where to draw the vertical indicator.

In response to the high signal at node 752, latch 726 is set producing a high signal at node 762 that sets latch 716. When latch 716 is set, a high signal at node 760 loads counter 714 with the inverse of the index value stored in index value bit storage 712. Counter 714 begins counting. Each counter increment represents a new line displayed by the OSD. When counter 714 overflows a high signal is produced at node 754. This represents the time when the line count is equal to the index value. When the signals at node 754 and 752 are high, the AND gate produces a high signal at node 756 setting latch 704. Latch 704 is arranged to produce an enable signal (logical high "1") at node 744. Latch 704 is reset based on when 2 bit counter expires. According to one embodiment of the invention, 2 bit counter 708 is arranged to count the time to draw a three pixel wide pulse to represent the vertical indicator. During the time the signal at node 744 is high, the OSD logic is overridden and the vertical indicator is drawn in the pixel overwrite area. More specifically, during the time the graph enable signal at node 744 is high, selectors 730–740 output the override video signal. In other words, the green, blue, and red video from the OSD logic is not selected during this time. According to one embodiment of the invention, selectors 730 and 732 output a bright green video signal to represent the vertical indicator. As will be appreciated any color may be used.

When the vertical indicator has been drawn, counter 708 is arranged to reset latch 704, thus reverting the display to its normal drawing color. In this way, the vertical indicator may be simply drawn, thereby requiring extremely low overhead from the microcontroller compared to conventional OSD devices.

While the vertical indicator illustrated is rectangular, it will be appreciated that the indicator does not have to be this shape. The vertical indicator could have varying patterns or could have some other shape.

Figure 8:
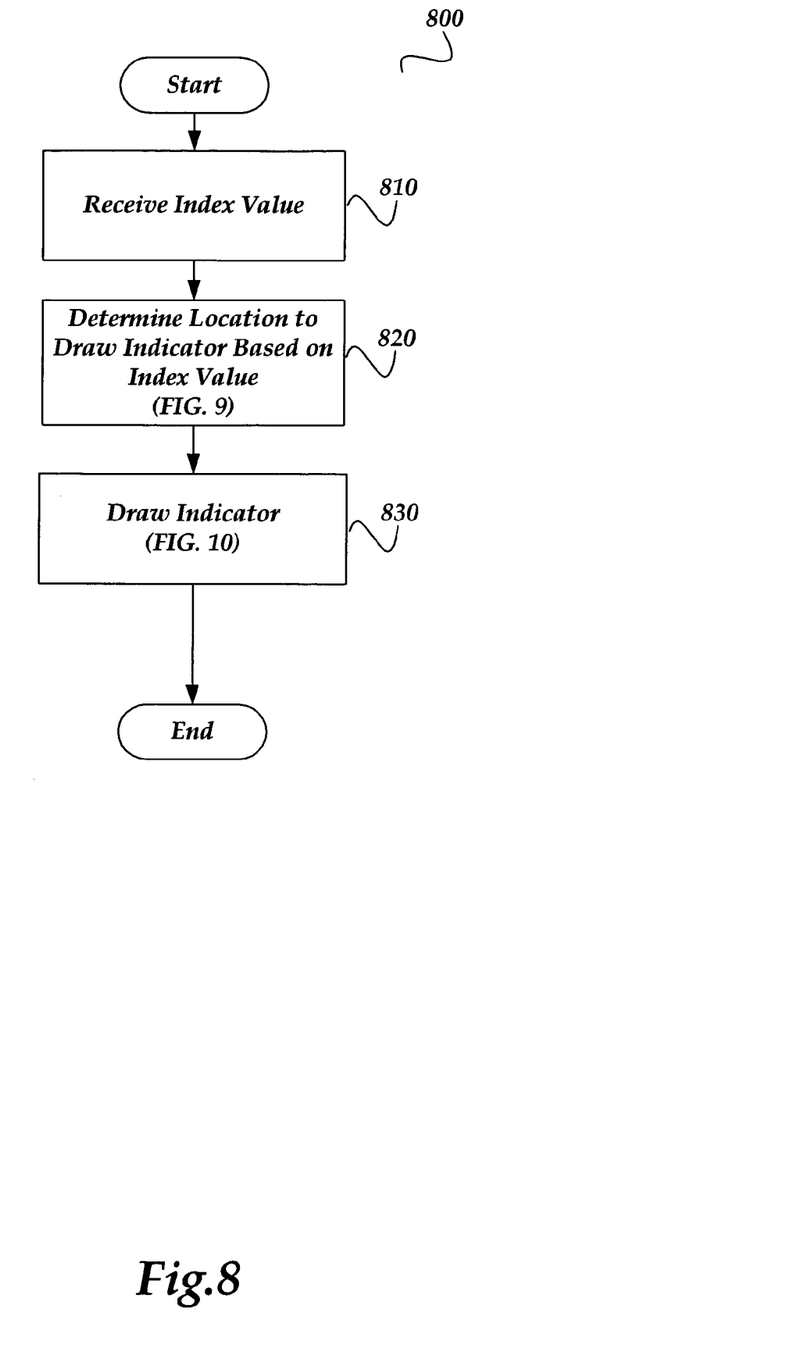
FIG. 8 illustrates the logical flow for operation of the OSD vertical indicator system.

FIG. 8 illustrates the logical flow for operation of an OSD vertical indicator system, according to one embodiment of the invention. After a start block, the logical flow moves to block 810 to receive the index value indicating what position to draw the vertical indicator. For example, if the range of value is between 0 and 16, the index value may be 16 to indicate that the indicator should be displayed on line 16.

Moving to block 820, the location to draw the indicator based on the index value is determined. The location is based on the index value as well as the character location of the OSD. (See FIG. 9 and related discussion).

Figure 10:
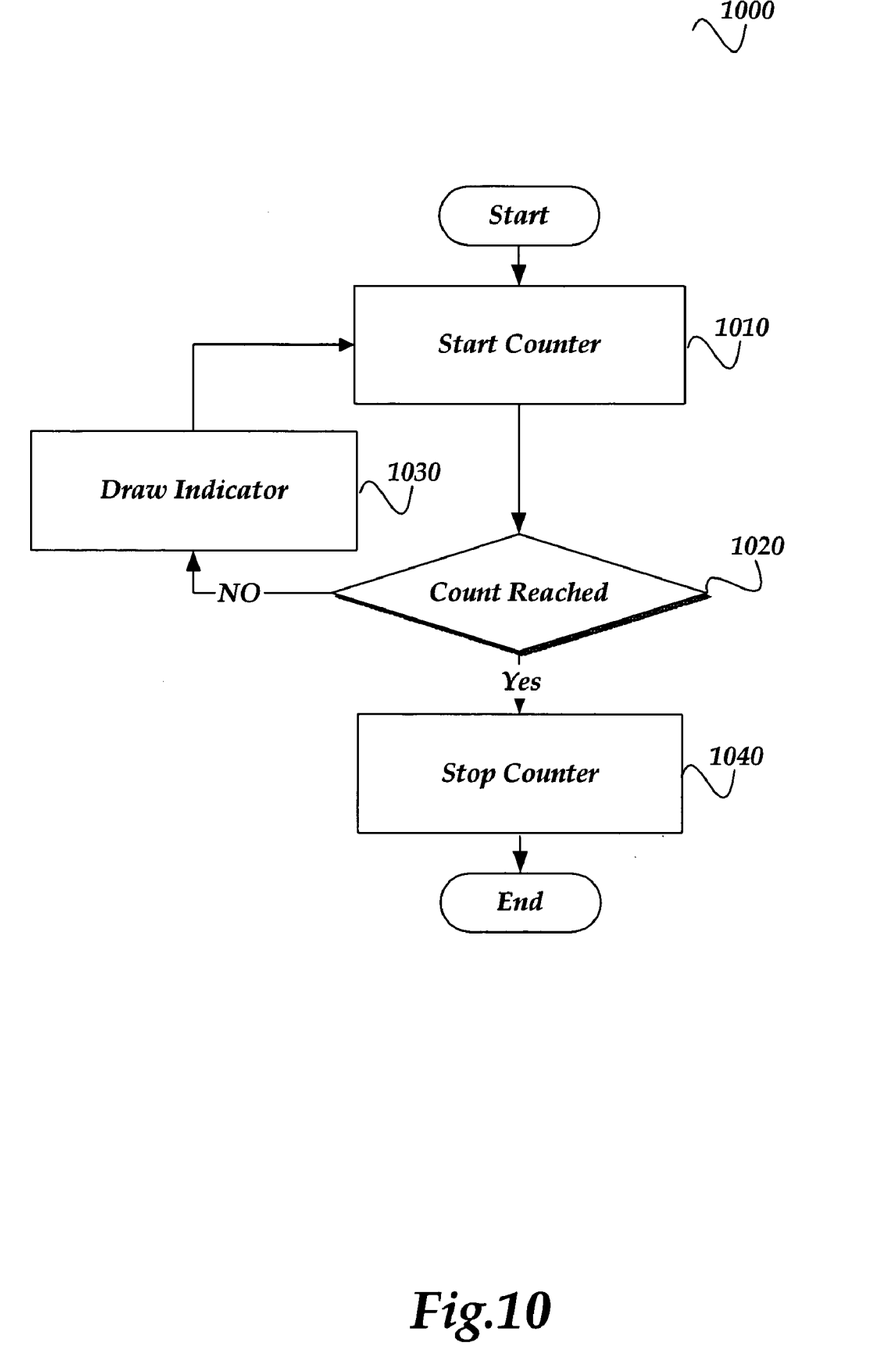
FIG. 10 illustrates a logical flow for drawing the indicator the appropriate size.

Transitioning to block 830, the indicator is drawn (See FIG. 10 and related discussion). The logical flow then ends.

Figure 9:
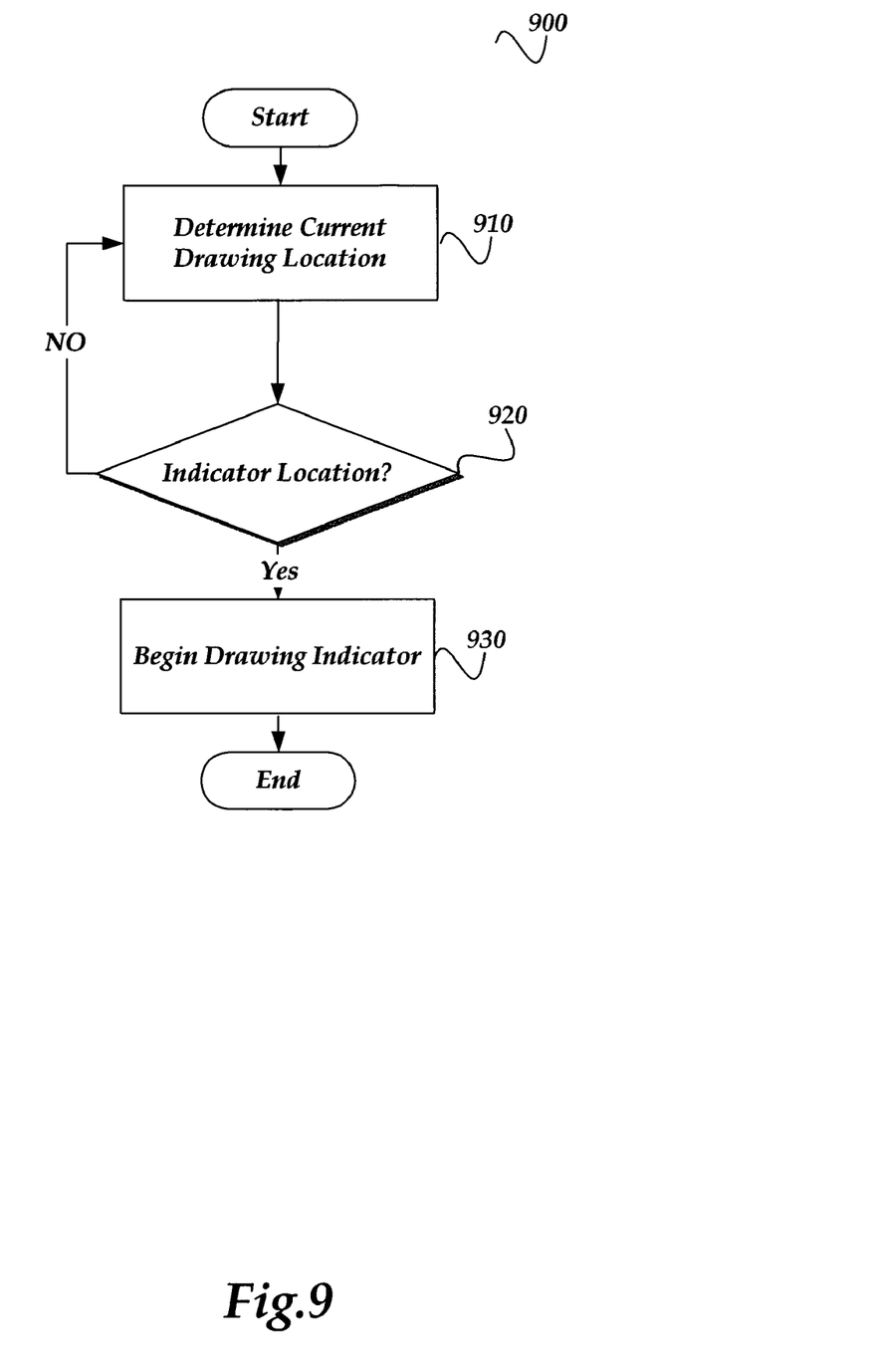
FIG. 9 illustrates a logical flow for a process to determine the location of the OSD drawing.

FIG. 9 illustrates a logical flow for determining the location to draw the vertical indicator, according to one embodiment of the invention. After a start block, the logical flow moves to block 910 where the logic determines the current drawing location for the OSD. The current drawing location is monitored to determine when the drawing address for the OSD reaches the location to draw the vertical indicator.

Transitioning to decision block 920, a determination is made as to whether the current drawing location is the location to draw the vertical indicator. When the drawing location is not the location for the vertical indicator the logic returns to block 910. When the drawing location is the location to draw the vertical indicator the logic flows to block 930 at which point the vertical indicator begins to be drawn. The logical flow ends.

FIG. 10 illustrates a logical flow for drawing the vertical indicator the appropriate size, according to one embodiment of the invention. After a start block, the logic flows to block 1010 where the counter is started. As discussed above, the counter counts to a predetermined value based on the desired size of the vertical indicator. Moving to decision block 1020, a determination is made as to whether count has been reached. If the count has not been reached, the logical flow transitions to block 1030 that draws the vertical indicator. When the count is reached, the logical flow moves to block 1040, and the counter is stopped. The logical flow then moves to an end block and the logic terminates.

Figure 11:
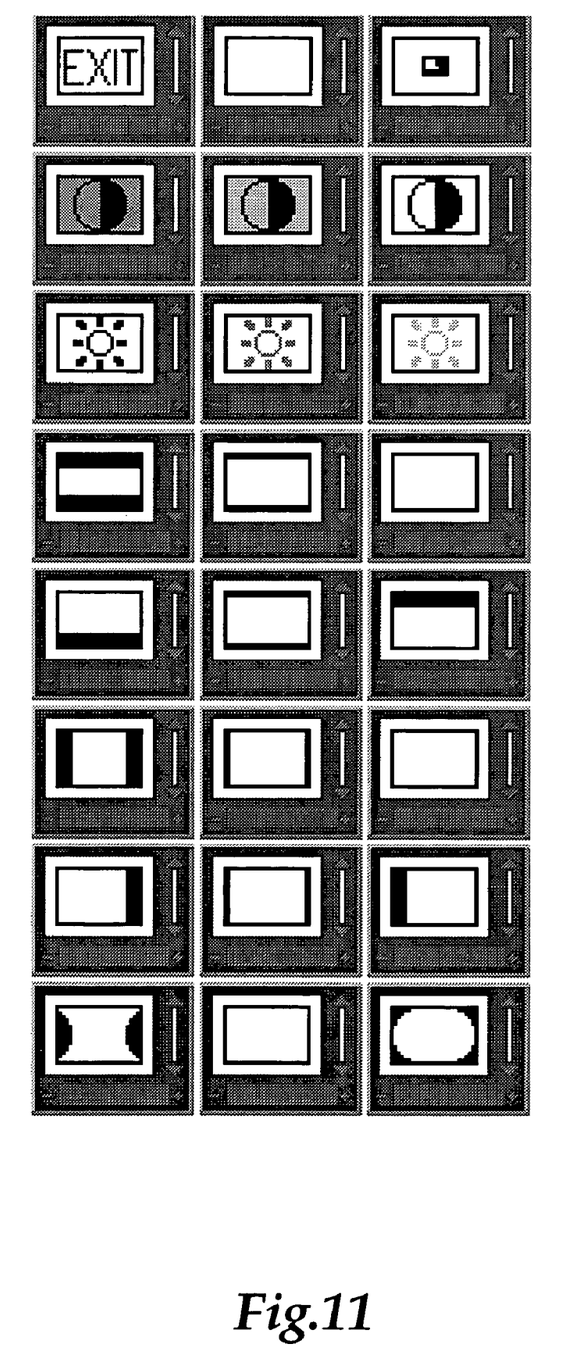
FIGS. 11 and 12 show exemplary icon bitmaps for use in the OSD system.
Figure 12:
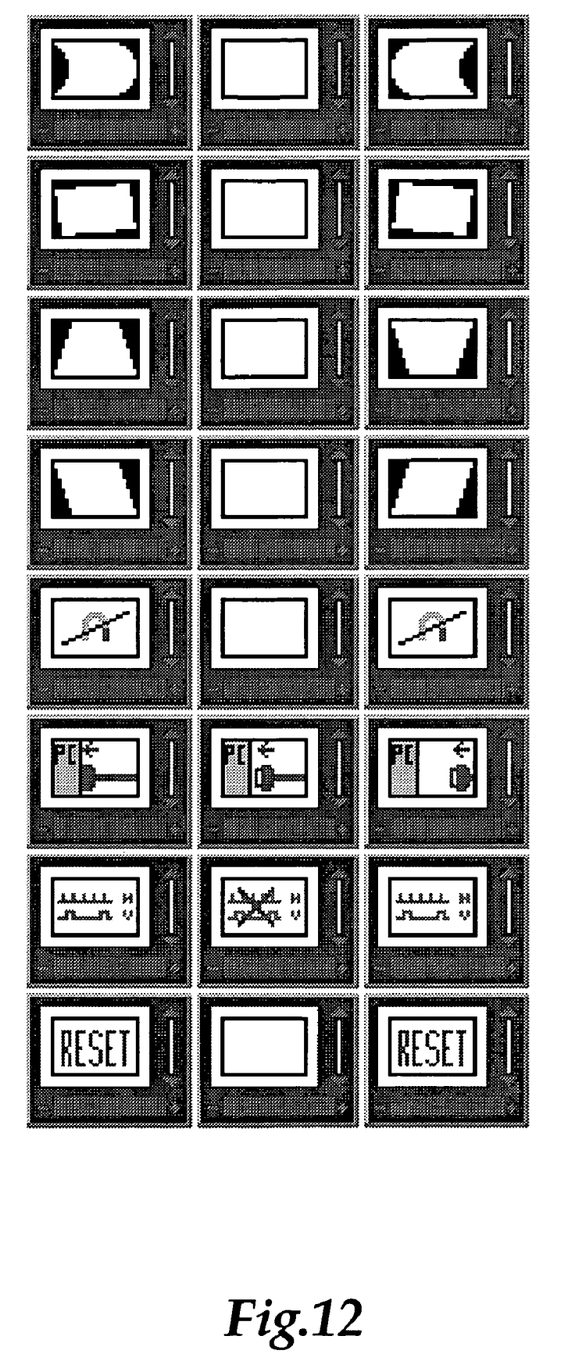

FIGS. 11 and 12 show exemplary icon bitmaps, according to one embodiment of the invention. There are 24 icon bitmaps shown in each figure. According to one embodiment of the invention, these are the initial icon bitmaps for the frames and icons within the OSD system. As will be appreciated, other icon bitmaps may be used depending upon the application.

The above specification, examples and data provide a complete description of the manufacture and use of the composition of the invention. Since many embodiments of the invention can be made without departing from the spirit and scope of the invention, the invention resides in the claims hereinafter appended.

I claim:

1. An apparatus to generate a vertical visual indicator for an on-screen display having an on-screen display (OSD) frame, comprising:

an address circuit arranged to locate a position of the vertical visual indicator and in response to locating the position of the vertical visual indicator producing a found signal; and an on-screen display logic circuit arranged to generate the vertical visual indicator in response to the found signal by overwriting a portion of the OSD frame; wherein the size of the vertical visual indicator is determined by a period of time that an override signal is produced during which time the OSD frame is overwritten.

2. The apparatus of claim 1, wherein the address circuit further comprises an indicator location circuit arranged to determine a character drawing location within the OSD frame, wherein the character drawing location is a frame character within the OSD frame where the vertical visual indicator is generated.

3. The apparatus of claim 2, wherein the address circuit further comprises a line location circuit arranged to determine a line drawing location within the character drawing location, wherein the line drawing location is a line within the OSD frame where the vertical visual indicator is generated.

4. The apparatus of claim 3, wherein the line drawing location is a position where the vertical visual indicator is drawn in response to an index value representing a desired position for the vertical visual indicator.

5. The apparatus of claim 4, wherein the address circuit farther comprises a line timer circuit arranged to determine the line drawing location by counting to a predetermined count based on the index value.

6. The apparatus of claim 3, wherein the address circuit further comprises a comparator circuit arranged to compare the character drawing location and the line drawing location, and in response to the comparison, the comparator producing the found signal.

7. The apparatus of claim 6, wherein the character drawing location is compared to a character value and the line drawing location is compared to a line value.

8. The apparatus of claim 7, wherein the found signal is produced when the comparison of the character drawing location equals the character value and the line drawing location equals the line value.

9. The apparatus of claim 1 further comprising a timer circuit arranged to produce a start signal in response to the found signal.

10. The apparatus of claim 9, wherein the on-screen display logic circuit is arranged to receive the start signal and in response to the start signal select the override output signal.

11. The apparatus of claim 9, wherein the timer circuit is arranged to produce a pixel overwrite signal for the predetermined time.

12. The apparatus of claim 11, wherein the on-screen display logic circuit sets the pixel overwrite signal to a specific color in response.

13. A method for generating a vertical visual indicator for an on-screen display having an on-screen display (OSD) frame, comprising:
   locating a position to draw the vertical visual indicator within the OSD frame;
   selecting a pixel overwrite signal when the position to draw the vertical visual indicator within the OSD frame has been located; and
   generating the vertical visual indicator by outputting the pixel overwrite signal for a predetermined time such that the size of the vertical visual indicator is determined by the length of the predetermined time the pixel overwrite signal is output.

14. The method of claim 13 wherein locating the position to draw the vertical visual indicator within the OSD frame, further comprises determining a character within the OSD frame that is partially overwritten when the vertical visual indicator is generated.

15. The method of claim 14 further comprising determining a line drawing location located within the character within the OSD frame that is overwritten when the vertical visual indicator is generated.

16. The method of claim 15, further comprising:
   receiving an index value representing the desired position for the vertical visual indicator; and
   using the index value to locate the line drawing location within the character within the OSD frame.

17. The method of claim 16 wherein using the index value to locate the line drawing location within the character within the OSD frame further comprises counting to a predetermined count based on the index value.

18. The Method of claim 17 further comprising:
   comparing the character drawing location to the line drawing location; and
   generating the vertical visual indicator based on the comparison.

19. The method of claim 18 further comprising, setting a color of the vertical visual indicator to a predetermined color.

20. An apparatus for generating a vertical visual indicator for an on-screen display having an on-screen display (OSD) frame, comprising:
   a means for locating a position to draw the vertical visual indicator within the OSD frame;
   a means for selecting a pixel overwrite signal; and
   a means for generating the vertical visual indicator by outputting the selected pixel overwrite signal for a predetermined time when the position to draw the vertical visual indicator within the OSD frame is located, wherein the size of the vertical visual indicator is determined by the length of the predetermined time the pixel overwrite signal is output.

* * * * *